April 21, 1925.  1,535,015
E. M. BALLOT
MACHINE FOR CUTTING A CAM SERVING TO CONTROL THE
FRONT WHEEL BRAKES OF MOTOR VEHICLES
Filed July 11, 1923  2 Sheets-Sheet 1
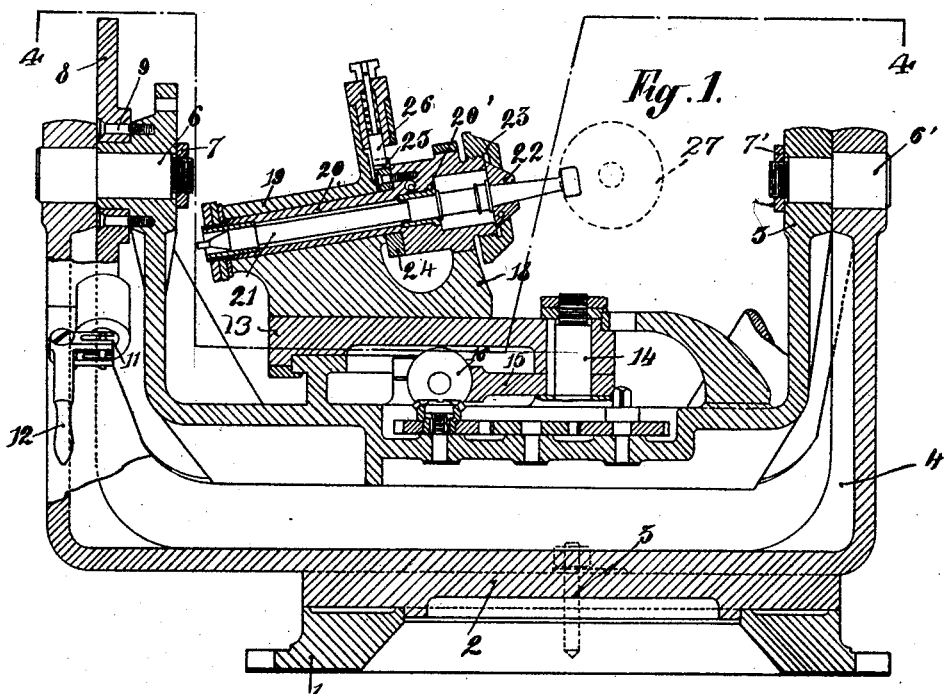
INVENTOR.
E. M. Ballot.
By William C. Linton
Atty.

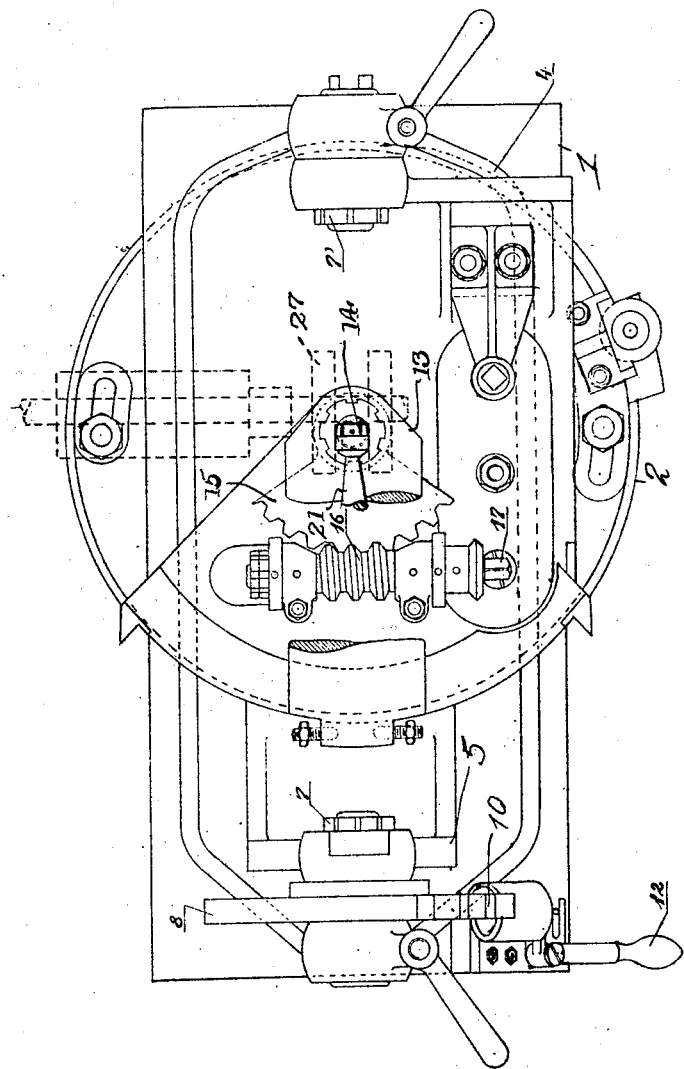

Patented Apr. 21, 1925.

1,535,015

UNITED STATES PATENT OFFICE.

ERNEST MAURICE BALLOT, OF PARIS, FRANCE.

MACHINE FOR CUTTING A CAM SERVING TO CONTROL THE FRONT-WHEEL BRAKES OF MOTOR VEHICLES.

Application filed July 11, 1923. Serial No. 650,937.

*To all whom it may concern:*

Be it known that I, ERNEST MAURICE BALLOT, a citizen of the Republic of France, residing in Paris, France, have invented new and useful Improvements in Machines for Cutting a Cam Serving to Control the Front-Wheel Brakes of Motor Vehicles, of which the following is a specification.

This invention relates to a machine for cutting a cam which serves chiefly for the control of front wheel brakes for motor vehicles.

The said cam, which has a special shape as set forth in my copending patent application (now Patent Number 1,489,732, dated April 8, 1924) is given a pivoting motion with respect to the sleeve upon which it acts whereof the axis occupies one or more different relative positions according as the brake segments are new or are more or less worn.

To obtain this result we dispose in a movable work-holding head, the cube or like piece out of which the said cam is to be cut, so as to give the said piece, with respect to two suitably disposed milling cutters, all the movements which the cam is to assume, when in actual use, with reference to the faces of the sleeve which it controls.

The said machine comprises a disc which imparts to the cube under operation all the various movements desired, whilst a suitable cradle will give the said cube two positions which correspond respectively with the cases wherein the segments are new or worn. With the said cradle, the two lateral faces can be cut in one operation with the pair of milling cutters in use, and then the top and bottom are cut by rotating the said cradle through 90 degrees.

The appended drawings which are given by way of example illustrate the said invention.

Fig. 1 is a view of the machine partly in elevation and partly in longitudinal plan.

Fig. 2 is a transverse section of the same.

Fig. 3 is a view of the arrangement for pivoting the cam upon its axis.

Fig. 4 is a plan view of the machine taken approximately on line 4—4 of Fig. 1.

The following description sets forth the machine according to the invention together with the principal elements of the same.

1 indicates the base plate upon which is mounted the whole apparatus which is revoluble about the axis 3 by means of the circular portion 2 which is integral with a U-shaped support 4. A cradle 5 is mounted between the two branches of said support and is secured thereto by the horizontal axles 6, 6′ and the nuts 7, 7′ the said cradle can be inclined at will and held in a given position by means of a disc 8 secured thereto by the bolts 9 and having the notches 10 co-operating with the latch 11 which is mounted upon the support 4 and can be controlled by the handle 12.

A disc 13 movable on the vertical shaft 14 is disposed upon the said cradle and in such position that coincidence will take place between the axes of the two pivotal connections 3 and 14 when the latter is in the vertical position. A quadrant 15 secured to the lower part of said disc co-operates with a worm 16 whose shaft has a square end 17 adapted for easy rotation by means of a wrench, so as to obtain the motion corresponding to the steering of the wheels, this being obtained herein by the rotation of the disc 13 about the axle 14.

Upon the said disc is secured the work-holding head 18 comprising a sleeve 19 having therein a cylindrical sleeve 20 containing, in the bearings 20′ thereof, the shaft 21 of the cam under operation. The shaft 21 is inclined to the axis of the pivot axles 6 and 6′ forming an angle thereby which is equal to the complement of the angle which would be formed by the intersection of the center line of the shaft 21 with the center line of the pivoting axle 14. A cone 22 which can be pressed by means of a suitably formed nut 23 against the shaft 21 serves to hold the latter in position.

A disc 24 secured to the sleeve 20 and having the notches 25 co-operating with the latch 26 serves to hold the said cylindrical sleeve 20 in position as desired; and consequently to hold fast the said shaft with respect to the head 18, whilst the whole device can be rotated in the sleeve 19 by means of the handle 28. The milling cutters for shaping the cam are disposed at 27 in two parallel planes at either side of the axis of the pivots 3, 14.

The said apparatus is operated as follows:

The cam is first placed between the two milling cutters 27, and the cam shaft 21 is then secured in the sleeve 20, the latter being held in the position corresponding to the intermediate notch 25. The cradle is placed in the vertical position, and the axis of the pivots 6, 6′ in a plane parallel with the milling cutters. One then turns the worm 16 in order to pivot the disc 13 by an amplitude corresponding to that of the steering of the front wheels of the motor vehicle, and during this period the milling cutters will cut out the cam according to a cylinder.

When this operation has been performed, the shaft 21 is moved on its axis to an angle of 15 degrees in either direction according to whether the cam is to serve for a right or left hand wheel and it is then held in this latter position by the latch 26.

To form the additional surfaces upon the cam which are to be used in connection with certain segments of the brake, the cradle 5 is turned upon its axis 6—6′ until the cam is returned to its initial position with respect to the milling cutter. The cradle is then locked in this position by the latch 11. The cutters are again brought into use, and the disc 13 is now moved by the turning of the worm gear 16 so as to form a cone upon the surface of the cam, and the two lateral faces thereof are now completed.

To form the upper and lower faces, after bringing the latch 26 into the intermediate notch 25, the said cradle is pivoted on the axis 6, 6′ through 90 degrees so as to place it in the horizontal position. When the cradle has been secured in this position, since the shaft 21 is no longer in a plane parallel with the cutters, it is brought into this plane by turning the disc 2 on the centre 3 by angle representing the complement of the angle between the pivoting axis and the axis of the cam. When these operations are performed, one again rotates the worm 16 so as to produce the motion corresponding to the steering.

It only remains to turn the cam through 15 degrees on the axes of shaft 21 and then to rotate the cradle in the proper direction through a like angle on the axis 6, 6′ and to pivot for the last time the disc 13 on the axis 14.

In this manner the cam will be cut according to the surfaces desired; since the different 15 degree rotations made during the operation correspond to the positions of the sleeve after the wear of the segments, the amount of this angle which is given by way of example may be different from what is above stated.

In this machine the milling cutters have a fixed position, and the said cam is given the movements which it is to assume upon the vehicle with respect to the sleeve which it controls. Obviously, a surface analogous to the one mentioned may be had by maintaining the same relative motion of the cutters and the cam, whether the cam alone is fixed or the two parts are movable at the same time.

Further, the said apparatus may be modified in detail, and chiefly as concerns the control of the movable disc 13, or the fastening devices, without departing from the principles of the invention as expressed by the scope of the claims.

I claim:

1. A cam cutting machine of the character described comprising a cam supporting sleeve, means for supporting said sleeve whereby it may be movable about four axes, one of these axes being that of the cam, two cutters arranged in such a manner as to cut simultaneously upon the cam, and retaining means for permitting the cam to be cut in one position determined with respect to the other three axes.

2. A cam cutting machine of the character described comprising a pivotally supported cradle, a horizontally movable disc supported by said cradle, a work holding sleeve arranged upon said disc, means for rotating said sleeve and means for holding said sleeve in its rotated position.

3. A cam cutting machine of the character described comprising a base, a U-shaped support pivotally supported upon said base, a movable cradle supported within said U-shaped support, a horizontally movable disc carried by said cradle having its axis extending in alignment with the axis of said U-shaped support, a worm gear and quadrant for transmitting motion to said disc, an adjustable work supporting sleeve carried by said disc, and means for retaining said sleeve in its adjusted position.

4. A cam cutting machine of the character described comprising a pivotally mounted U-shaped support, a cradle pivotally connected to the opposite ends of said U-shaped support, adapted to move in a lateral direction, a disc pivotally supported upon said U-shaped support and capable of movement in a horizontal plane, a work supporting sleeve mounted upon said disc and extending in a diagonal direction between the ends of said U-shaped support, and means for moving said sleeve.

In witness whereof I affix my signature.

ERNEST MAURICE BALLOT.